(12) United States Patent
Takamatsu et al.

(10) Patent No.: US 7,366,394 B2
(45) Date of Patent: Apr. 29, 2008

(54) MULTILAYER OBSERVATION OPTICAL MICROSCOPE AND MULTILAYER OBSERVATION UNIT

(75) Inventors: Tetsuro Takamatsu, Kyoto (JP); Katsumasa Fujita, Osaka (JP)

(73) Assignee: Kansai Technology Licensing Organization Co., Ltd., Kyoto (JP)

( * ) Notice: Subject to any disclaimer, the term of this patent is extended or adjusted under 35 U.S.C. 154(b) by 55 days.

(21) Appl. No.: 10/540,600

(22) PCT Filed: Dec. 24, 2003

(86) PCT No.: PCT/JP03/16641

§ 371 (c)(1),
(2), (4) Date: Jun. 24, 2005

(87) PCT Pub. No.: WO2004/061515

PCT Pub. Date: Jul. 22, 2004

(65) Prior Publication Data

US 2006/0147176 A1    Jul. 6, 2006

(30) Foreign Application Priority Data

Dec. 27, 2002 (JP) ............................. 2002-379869
Sep. 29, 2003 (JP) ............................. 2003-337105

(51) Int. Cl.
*G02B 6/00* (2006.01)
*G02B 21/00* (2006.01)

(52) U.S. Cl. ....................................... 385/147; 359/371
(58) Field of Classification Search ..................... None
See application file for complete search history.

(56) References Cited

U.S. PATENT DOCUMENTS 5,952,562 A * 9/1999 Yagi et al. ..................... 73/105
6,094,300 A    7/2000 Kashima et al.
6,404,545 B1 * 6/2002 Ishiwata ..................... 359/371

FOREIGN PATENT DOCUMENTS

| JP | 08/136810 | 5/1996 |
| JP | 11-038324 | 2/1999 |
| JP | 2002-287035 | 10/2002 |

* cited by examiner

*Primary Examiner*—Tina M. Wong
(74) *Attorney, Agent, or Firm*—Kirschstein, et al.

(57) ABSTRACT

In an optical microscope, a pair of convergence/collimation lenses (5, 6) are arranged in the common optical axis of a light beam directed toward a sample (15) being observed through an objective lens (14) and a light beam radiated or reflected from the sample to pass through the objective lens respectively. A means (7) varying the phase of the transmitting light beam is varied within a specified range is provided between these lenses so that the sample is irradiated while being focused at a depth corresponding to the phase at the wave front of the light beam entering the objective lens.

6 Claims, 5 Drawing Sheets

MULTILAYER OBSERVATION OPTICAL MICROSCOPE AND MULTILAYER OBSERVATION UNIT

TECHNICAL FIELD

This invention relates to an optical microscope, and particularly, to a multilayer observation optical microscope for observation of a three-dimensional dynamic state of an sample in real time, and to a multilayer observation unit that can be used in the optical microscopes.

BACKGROUND ART

Figure 5:
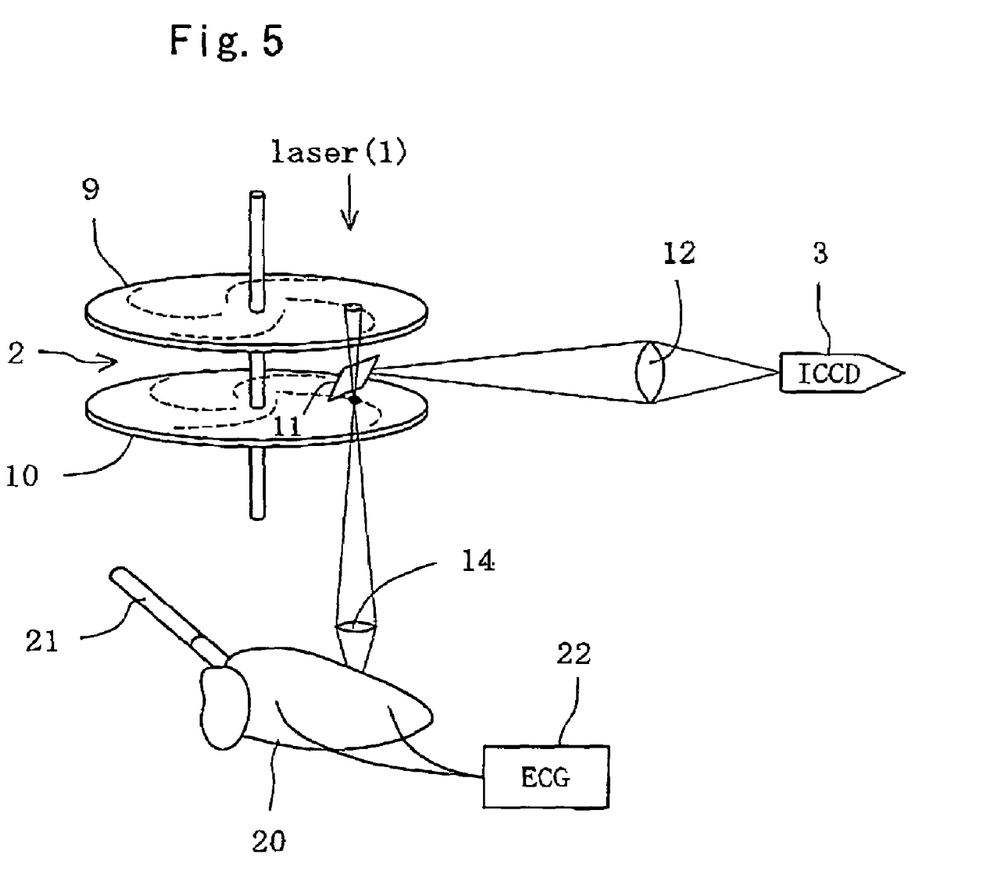
FIG. 5 is a schematic diagram illustrating a conventional confocal microscope employed for observation of an outline of a state where a heart tissue of a rat.

A microscope is generally used for observation of a sample at each depth by adjusting focal point alignment. Especially, a confocal microscope has an excellent resolution in a direction of the optical axis and enables observation of an optical slice image of a sample having a three dimensional structure. Thus the microscopes, in recent years, have been rapidly employed widely in the fields of medicine and biology as optical observation means. FIG. 5 illustrates a fundamental configuration of the confocal microscope. Referring to FIG. 5, a laser light beam emitted from a laser light source 1 is converged, for example, using microlenses of a lens array disc 9 in a double rotating disc 2 (described later), transmitted through a dichroic mirror 11, focused in a pinhole of a Nipkow disc 10, which is another rotating disc, and emitted from the pinhole; the sample is irradiated with the laser light beam from the pinhole through an objective lens 14, fluorescence emitted from the sample by excitation is propagated on the same path in the opposite direction as the observation light beam and is caused to pass through the same pinhole (a so-called confocal point) to thereby conduct measurement.

The measurement is conducted in a manner such that fluorescence after passing through the pinhole is reflected on the dichroic mirror 11 and then converged by a convex lens 12 and directed to a high speed CCD camera 3. In a case where a live tissue is observed with such a confocal microscope (for example, an observation of a mouse heart tissue), observation is performed with some level of effectiveness on the removed heart 20 or the like perfused using a cannula 21 and an observation site thereof is irradiated with a laser light beam while being monitored by an electrocardiogram measuring instrument 22.

Since a confocal microscope has high resolution in the optical axis, however, it is necessary to observe a live cell and a live tissue at different depth of observation in order to obtain three-dimensional images of the live cell and the live tissue in real time, which requires moving things each having a weight, such as the sample stage and the objective lens; therefore, a three dimensional observation in real time has been disabled (see, for example, a patent document No. 1 (JP-A No. 06-341955) and a non-patent literature No. 1 (OLYMPUS OPTICAL CO., LTD's catalogue "scanning laser microscope" retrieved Sep. 30, 2002 from a homepage of Internet, URL: http://www.nagano-it.go.jp/seimitu/setubi/se-shuuseki10/se-04laser.html (column on specifications).

DISCLOSURE OF THE INVENTION

It is a fundamental object of the invention to provide an optical system solving difficulty in three dimensional scanning in an optical microscope system including a conventional confocal laser microscope as described above.

It is another object of the invention to provide an optical system enabling observation of a three dimensional dynamic state of a live tissue and cell with a fluorescence microscope at high speed.

A first invention, in order to achieve the fundamental object, is directed to a multilayer observation optical microscope, wherein, a pair of convergence/collimation lenses are arranged on the optical axis along which an irradiation light beam enters into an sample from the objective lens, and a phase varying means is arranged between the lenses for varying a phase of a transmitting light beam in a given area on a plane traversing the optical axis, and thereby, the light beam incident on the objective lens is focused on the sample at a depth corresponding to the phase of a wavefront thereof.

According to the fundamental configuration, the wavefront of the irradiation light beam outputting from the collimation lens through the phase varying means changes its phase in a certain area of a plane traversing the optical axis in each state of the phase varying means opposite the collimation lens. Then as the level of change in phase is larger, the depth of a focal point of a light beam incident on the objective lens is correspondingly deeper. A width of change in depth of a focus can be wider depending on a wavelength of the irradiation light beam and in the invention, the depth can be realized to a value on the order of 100 µm in the visual wavelength band (which depends on an NA and a magnification of an objective lens to be used).

According to a second aspect of the invention, in a confocal microscope, the optical axis on which the pair of convergence/collimation lenses are arranged is a common optical axis of an irradiation light beam with which an sample is irradiated through an objective lens and a fluorescent beam radiated from or reflected by the sample and passing through the objective lens in a reverse direction, in which construction a technical effect of the first invention is mostly exerted in the confocal microscope.

The observation light beam is a light beam including information on an sample, and a fluorescent beam excited by an irradiation light beam or a reflecting light.

According to a third aspect of the invention, the phase varying means comprises a rotating disc having plural phase plate segments thereon, the respective phase plate segments having optical characteristics stepwise different from each other and sequentially traversing the optical axis.

According to a fourth aspect of the invention, the respective phase plate segments of the phase varying means comprise isotropic transparent films of different thickness so as to effect different optical characteristics thereof.

According to a fifth aspect of the invention, the respective phase plate segments of the phase varying means comprise isotropic transparent films having different refractive index so as to effect different optical characteristic thereof.

According to a sixth aspect of the invention, two-dimensional scanning on a sample stage of the optical microscope and phase scanning with the phase varying means are synchronized with each other so as to enable a three-dimensional dynamic state of the sample to be observed. With such a construction, a CCD) camera, for example an intensified high speed CCD camera with an existing image pickup speed of 1000 frames/sec, placed at the end of the optical path for fluorescence observation makes it possible to observe a three-dimensional dynamic state of a live tissue at high speed.

A first optical axis direction observation position control means for displacement of a sample stage or an objective lens, a pair of convergence/collimation lenses disposed in the optical axis along which an irradiation light beam incident on a sample impinges through the objective lens, and a second optical axis direction observation position control means are arranged. The second optical axis direction observation position control means comprises a phase varying means disposed between the two lenses for changing a phase of a transmitting light in a given area on a plane traversing the optical axis. Consequently, not only is observation of a sample at a deep position in the optical axis enabled, but also observation in the optical direction can also be minutely effected in a short time. In addition, two-dimensional scanning on the sample stage of the optical microscope with a sample light beam is synchronized with the first optical axis direction observation position control means and the second optical axis direction observation position control means, so that three-dimensional observation of a sample can be achieved in a specific region. In order to generate a three dimensional image from information obtained by the synchronization operation, normalization of control lengths of the first optical axis direction observation position control means and the second optical axis direction observation position control means is conducted in advance. In addition, by normalizing control lengths of the first optical axis direction observation position control means and the second optical axis direction observation position control means, a length in the optical axis can be measured by the second optical axis direction observation position control means in a short time. That is, by employing a multilayer observation optical microscope, wherein a pair of convergence/collimation lenses are arranged on the optical axis along which an irradiation light beam enters into an sample from the objective lens, and a phase varying means is arranged between the lenses for varying a phase of a transmitting light beam in a given area on a plane traversing the optical, a first observation plane obtained by a first set value of the phase varying means is observed and a second observation plane obtained by a second set value of the phase varying means is observed, and a distance in the optical axis direction between the first observation plane and the second observation plane can be measured from a difference between the first set value of the phase varying means and the second set value of the phase varying means.

A three-dimensional inspection method can be realized on a sample in the medical organ field and a sample in the electronics field. That is, it is determined whether a sample is normal or not by a process including the following steps; a step of preparing an sample having an optically three-dimensional structure; a step of setting the sample on a sample stage; a step of measuring three-dimensional digital data of the sample using the construction of an optical microscope according to the claimed invention; a step of setting three-dimensional inspection criterion digital data capable of determining that the sample has a normal three-dimensional shape; and a step of comparing the measured three-dimensional digital data of the sample with the inspection criterion digital data. Repeated measurement of three-dimensional data also enables inspection of a dynamic state.

In preparation of a sample of the medical organ field, it is made possible to prepare an sample enabling the sample to be observed with optical sharpness by mixing a fluorescent material into the sample. Preparation of a sample in the electronics field is performed in a process for forming depressions and protrusions on a substrate surface.

It is possible not only to determine two-dimensional data, but also to inspect with three-dimensional data including data in the depth direction. While, in a semiconductor integrated circuit, a surface structure is more and more three-dimensional, inspection can be performed at high speed by a three-dimensional inspection method of the invention.

A seventh invention provides a multilayer observation unit comprising a rotating disc having plural phase plate segments thereon, the respective phase plate segments having optical characteristics stepwise different from each other and being adjacently arranged in a circumferential direction, wherein the multilayer observation unit is arranged between a pair of convergence/collimating lenses disposed on an optical axis of a light beam incident on an objective lens so as to serve as a phase varying means for varying a phase of a light beam transmitting through the respective phase plate segments in a given area on a plane traversing the optical axis when the phase plate segments sequentially traverse the optical axis between the lenses, whereby a focus depth is changed according to the phase of the wavefront of a light beam incident on the objective lens through the unit.

According to a multilayer observation real-time optical microscope, especially a confocal microscope, of the invention, a three-dimensional structure of a cell and an tissue can be observed as it is with a high precision. That is, in a conventional method that cannot conduct observation in layers, a working of a tissue, which is essentially three-dimensional, is transformed only into a two-dimensional plane by cell culture or the like in a Petri dish to thereby visualize the working, which makes it difficult to be said that the cell culture captures a natural state of an organ, whereas in the invention, the working of a organ is visualized at high speed and sterographically.

BEST MODE FOR CARRYING OUT THE INVENTION

According to an embodiment of the invention, there is provided a multilayer observation unit enabling a high speed observation of a three dimensional dynamic state of a cell, a tissue or the like. A construction of the entire microscope is such that a disc composed of optical phase plate segments as a phase varying means constituting the multilayer observation unit (a unit observing multiple layers at respective observation depths in the z direction) is inserted between a microscope that has been put into practical use which observes a two dimensional (x-y) plane at high speed and a light source (a laser) used therefor. The unit has a construction in which optical phase plate segments (circular arc pieces) having stepwise different optical characteristic are arranged in the shape of a disc in such a manner that the segments sequentially traverse the optical axis by rotation and, with such a construction, changes an observation depth at high speed to thereby obtain two-dimensional slice images at depths (in layers), thereby enabling a three-dimensional image of a tissue cell to be synthesized and reproduced.

Applicable optical microscopes can include: a general fluorescence microscope, a two-photon microscope and an optical microscope in which an sample is irradiated with a light beam using an objective lens, in addition to a confocal microscope, and description will be given of a confocal microscope that is the most effective in the following preferred embodiment.

Figure 1:
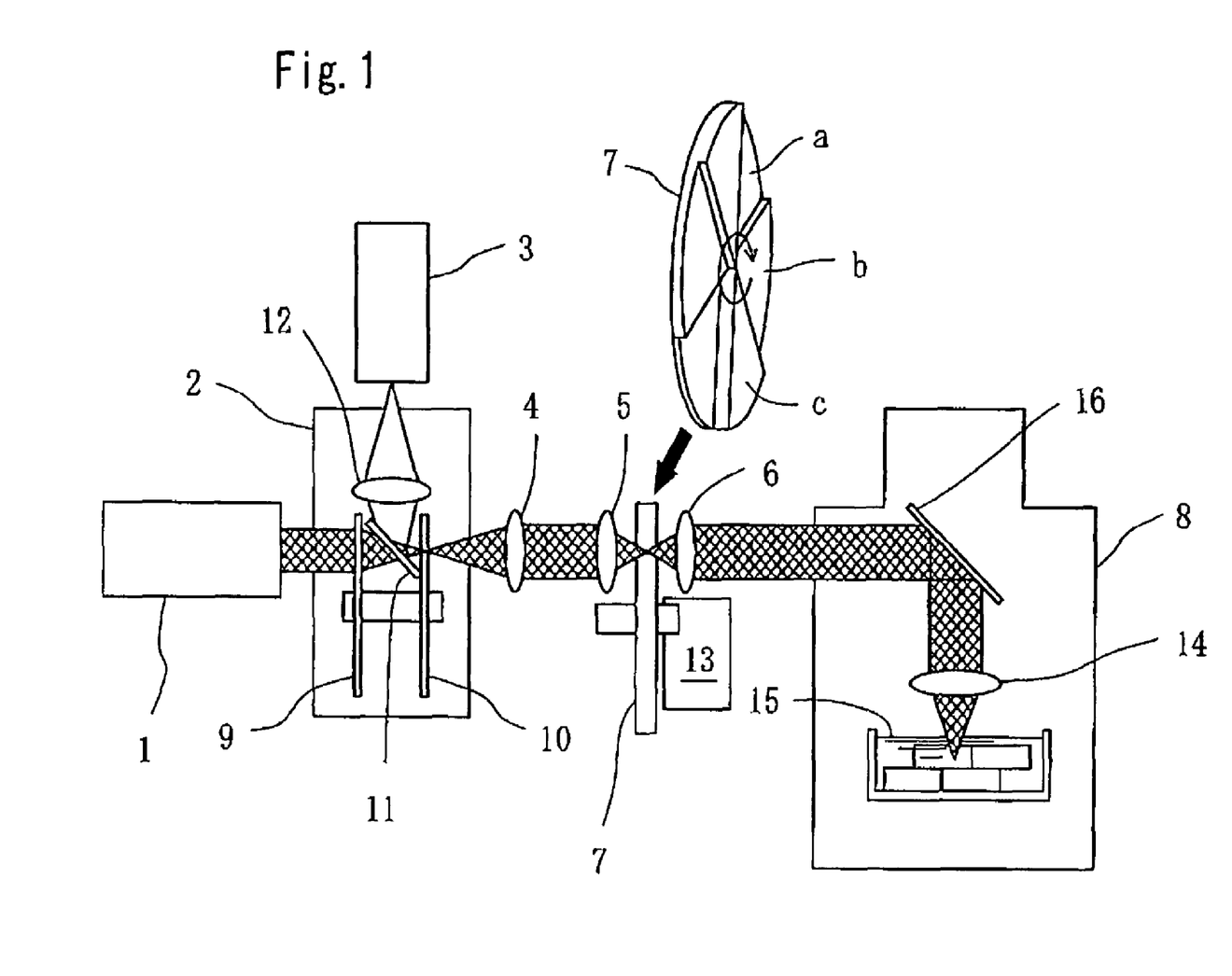
FIG. 1 is a schematic diagram illustrating an optical system of a multilayer observation real-time confocal microscope according to an embodiment of the invention.

A preferred embodiment of a multilayer observation real-time confocal microscope of the invention is as shown in FIG. 1. In the optical system shown in FIG. 1, the reference numeral 1 designates a laser light source, the reference numeral 2 designates a double rotating disc type high speed confocal scanner; the reference numeral 3 designates an intensified high speed CCD camera, the reference numeral 4 designates a convex lens collimating a laser light beam exiting through a pinhole of the high speed confocal scanner 2, the reference numeral 5 designates a convergence lens and the reference numeral 6 designates a second convex lens collimating a laser light beam to form a reversed image exiting the converging lens 5, and a disc comprised of optical phase plate segments as a phase varying means constituting a multilayer observation unit 7 is inserted between the lenses 5 and 6. A collimated laser light beam exiting the lens 6 is directed to a fluorescence phase contrast microscope unit 8.

The high speed confocal scanner 2 is constructed in such a manner that a microlens array disc 9 disposed on the laser light source 1 side and a so-called Nipkow disc 10 having many pinholes arranged spirally on the collimation lens 4 side are coaxially installed with and opposite each other (see FIG. 5), wherein the microlens array of the disc 9 are naturally arranged spirally so as to correspond to the pinhole array and both discs 9, 10 rotate at a high speed, thereby enabling x-y scanning with the optical axis, for example, at the maximum speed of 1000 frames/sec to be realized.

A dichroic mirror 11 transmitting an excitation laser light beam and reflecting fluorescence returned back from the sample is inserted between both discs 9 and 10, a convex lens 12 is disposed in a reflecting fluorescent beam optical path, and an image is formed on a light receiving face of the CCD camera 3. The CCD camera 3 can pick up an x-y scanning image with the optical axis at the maximum speed 1000 frames/sec in correspondence to the high speed confocal scanner 2.

Only the side view of a multilayer observation unit 7 of the invention is shown together with a driving motor 13 in the optical system of FIG. 1 and an example construction of the unit is an arrangement of plural phase plate segments a, b and c . . . in the shape of a disc, where different in optical characteristics are different from one another, as shown in a perspective view of the part depicted above the figure. Structures in which an optical characteristic is stepwise altered include: a structure in which thickness is stepwise altered, a structure in which a refractive index is stepwise altered without changing a thickness, and a structure in which both variations are combined, as shown in an enlarged perspective view, in a case where isotropic transparent films (not shown in the corresponding perspective view by division) each as a constituent element of each of the phase plate segments are made of the same filmy material as one another.

A laser beam passing through the multilayer observation unit 7 and exiting the collimation lens 6 impinges on the objective lens 14 in the fluorescence phase contrast microscope unit 8 and is, as shown as model, focused in a cell/tissue sample 15 accommodated in a Petri dish or the like at a variable depth. In this case, an optical path bending mirror 16 constituted of a plane mirror is disposed before the objective lens 14 in the microscope unit 8 for convenience in optical system construction (see FIG. 1).

Figure 2:
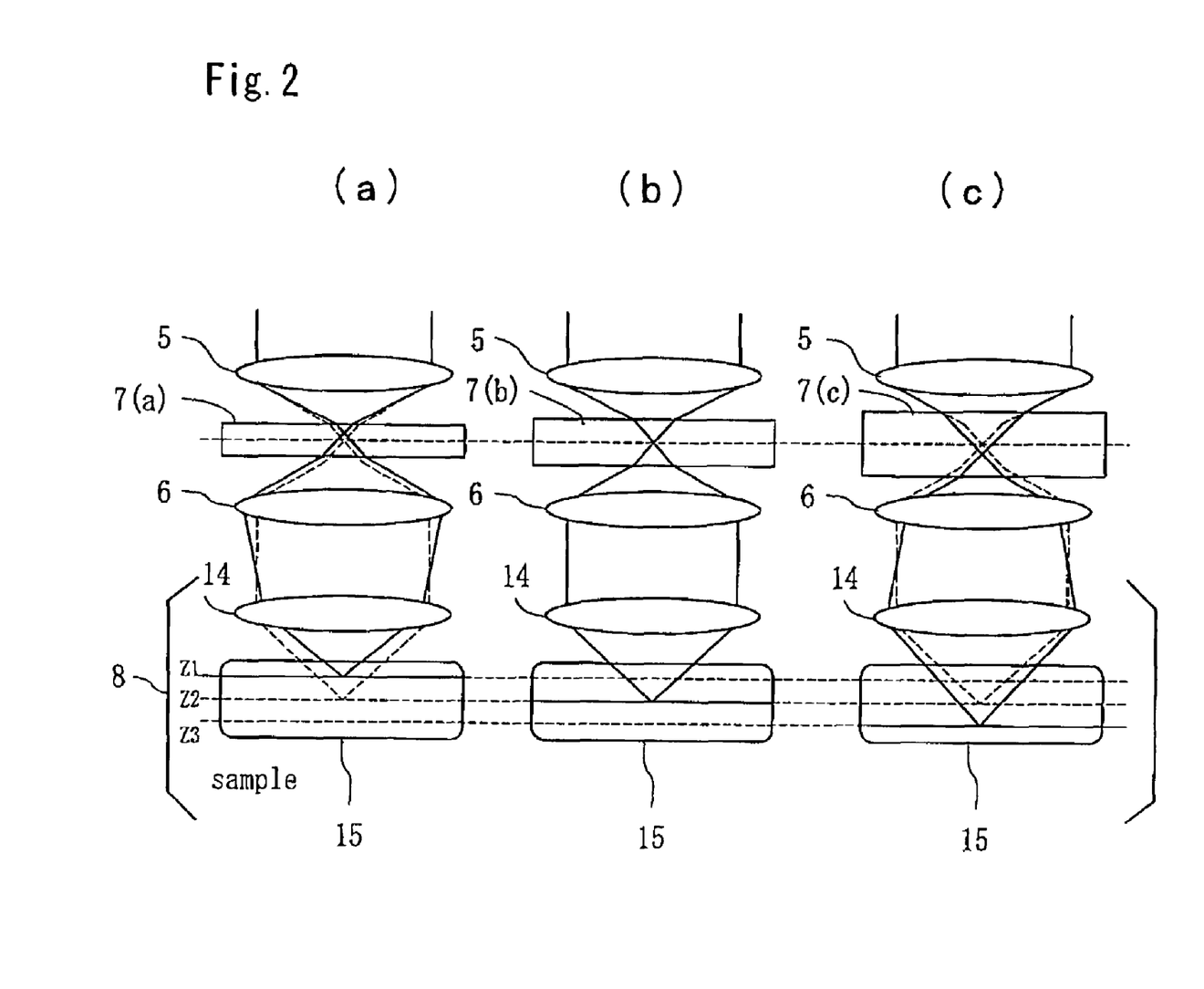
FIGS. 2(a) to 2(c) are schematic diagrams of a multilayer observation unit serving as a main part of the microscope shown in FIG. 1, wherein a focus depth becomes deeper in order of FIG. 2(a), FIG. 2(b) and FIG. 2(c).

FIGS. 2(a) to 2(c) are model views showing a procedure for effectively adjusting a depth of a focus formed by the objective lens 14 by a phase plate of the multilayer observation unit 7 inserted between the convergence/collimation lenses 5 and 6, in which the above described optical path bending mirror 16 is omitted. Herein, FIG. 2(a) is a case where a phase plate element of a segment in the optical path of the multilayer observation unit 7 is the thinnest, FIGS. 2(b) and (c) are cases where thicknesses of the elements are sequentially thicker than in FIG. 2(a), which are all depicted in alignment of a reference intermediate image forming plane between the lenses 5 and 6 with each of the intermediate levels.

In FIG. 2(a), a phase plate element is thin, so that a distance in which the light beam exits from the periphery of the convergence lens 5, enters the phase plate element 7(a), intersects the optical axis and exits from the same element 7(a) is relatively short (therefore, a distance from the optical axis passage section is also smaller) and a phase difference between the part and the optical axis emission section (a phase delay of the former case) is comparatively small. Therefore, the light wave is focused by the objective lens 14 at the uppermost position Z1 in the sample 15.

In FIG. 2(b), a phase plate element is thicker than in FIG. 2(a), so that a distance in which the light beam exits from the periphery of the convergence lens 5, enters the phase plate element 7(b), intersects the optical axis and exits from the same element 7(b) is slightly longer (therefore, a difference from the optical axis passage section is slightly longer) and a phase difference between the part and the optical axis emission section (a phase delay of the former case) is slightly larger. Therefore, the light wave is focused by the objective lens 14 at the next level (here the intermediate position) Z2 in the sample 15.

In FIG. 2(c), a phase plate element is thicker than in FIG. 2(b), so that a distance of a light beam path in which the light beam exits from the periphery of the convergence lens 5, enters the phase plate element 7(c), intersects the optical axis and exits from the same element 7(c) is further longer (therefore, a difference in distance from the optical axis passage section is further longer) and a phase difference between the part and the optical axis emission section (a phase delay of the former case) is further larger. Therefore, the light wave is focused by the objective lens 14 at the next level (here the most lowest position) Z3 in the sample 15.

From the above description, it can be understood that since, in the embodiment of the invention, a phase plate element of the multilayer observation unit 7 is thicker as an element is displaced in order of a segment a, to a segment b and to a segment c, a depth of a focus of the wavefront emitted in an area from the optical axis point to the periphery in an object plane of the objective lens 14 is effectively displaced by a sufficient distance. It is clear that the displacement of a depth occurs, as in the embodiment, in a case where thicknesses of phase plate segments (isotropic transparent films) in the multilayer observation unit 7 are stepwise altered, in addition thereto, in a case where refractive indexes thereof are stepwise altered without changing thickness or in a case where both cases are combined with each other.

Figure 3:
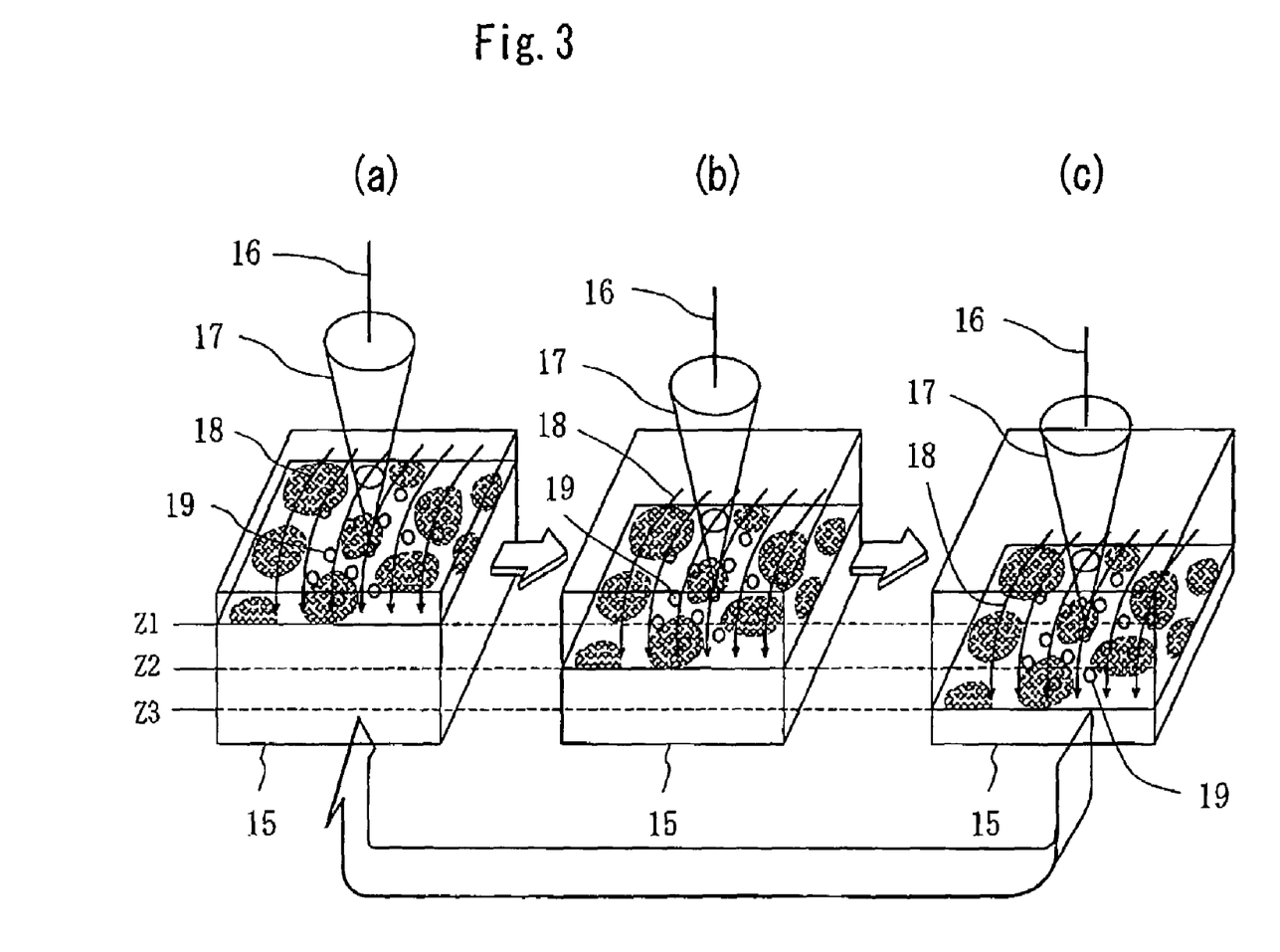
FIGS. 3(a) to 3(c) are schematic diagrams illustrating a procedure for synthesizing a three-dimensional image in which, in a multilayer observation real-time confocal microscope of the invention, a two-dimensional scanning (picking-up of optical laminagrams) is performed at three levels of the lowest depth Z1 shown in FIG. 3(a), a mean depth Z2 shown in FIG. 3(b) and the highest depth Z3 shown in FIG. 3(c) in the order.

FIGS. 3(a) to 3(c) are model diagrams showing a general procedure in which an optical cross-sectioned images are obtained while an observation depth is sequentially altered with a high speed confocal microscope of the invention and a real-time three-dimensional image is obtained by an image processing with the images. In FIG. 3(a), the sample is two-dimensionally scanned at the focal point level Z1 established by the phase plate segment of FIG. 2(a). In FIG. 3(b), the sample is two-dimensionally scanned at the focal point level Z2 established by the phase plate segment of FIG. 2(b) and besides, in FIG. 3(c), the sample is two-dimensionally scanned at the focal point level Z3 established by the phase plate segment of FIG. 2(c).

Plural lines 18 drawn at each level are scanning lines formed according to the number of the microlens/pinhole array on the double disc 9 and 10 of the high speed focal point scanner 2 shown in FIG. 1 and reference numeral 19 indicates focal points formed with the laser light beam 17 on scanning lines. Therefore, fluorescence propagating in a similar optical path to that of the laser light beam in the forward direction, in the reverse direction is adjusted with respect to the phase of the wavefront by the multilayer observation unit 7 in similar way and passes through a pinhole located at the optical axis on the Nipkow disc 10 of the high speed confocal scanner 2, and reflected on the dichroic mirror 11, and the reflecting fluorescent beam passes through the convex lens 12 to be received and pickup processed by the high speed CCD camera 3, which is described above.

The steps of FIGS. 3(a) to 3(c) in the embodiment are preferably performed in a time of the order of 1/30 sec and resulted data is synthesized by the high speed CCD camera 3 as a three-dimensional image after an image is acquired. For example, in a case where three-dimensional observation in three layers is conducted using a high speed CCD camera at 1000 frame/sec, a stereographical image can be obtained at a speed 1000/3=333.3 frame/second.

Figure 4:
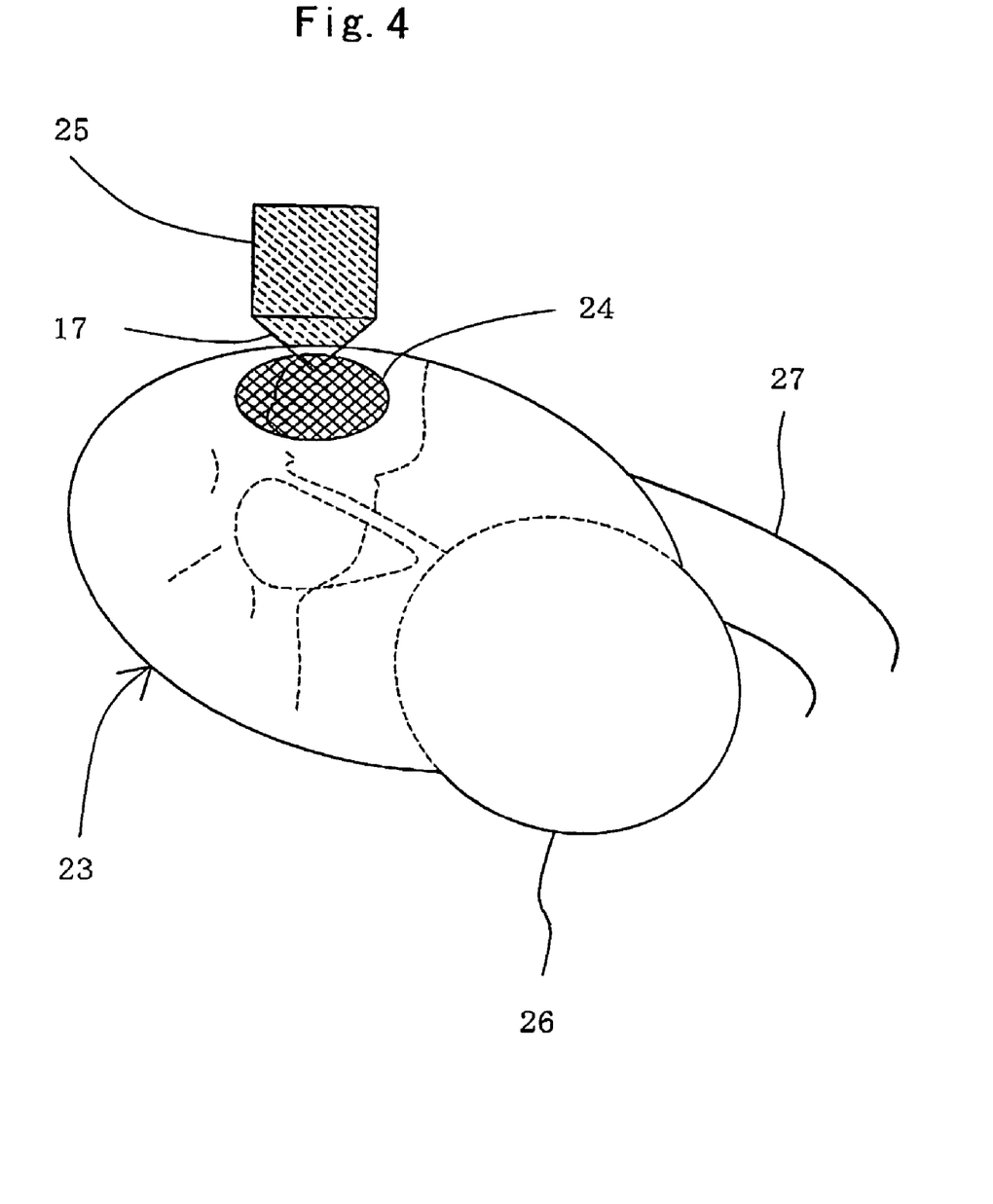
FIG. 4 is a schematic diagram illustrating a multilayer observation real-time confocal microscope of the invention employed for observation of an actual tissue.

FIG. 4 is a model diagram in a case where cells of a left ventricle 23 and a cardiac infarction area 24 of a heart are observed in real time with a real-time confocal microscope of the invention. A laser light beam 17 exited from the fore end 25 of a laser light path (an objective lens) of a confocal microscope is used in two-dimensional scanning in multiple layers according to the way described above, cells in the region 24 are observed in real time as a three-dimensional image and, for example, it is easily found that a necrosis has been produced or the like fact. Note that reference numeral 26 indicates a heart atrium and 27 an aorta.

The whole left ventricle 23 can also be observed by moving the sample stage or the objective lens in the optical axis. By normalizing a distance of displacement of the sample stage or the objective lens in the optical axis and a distance of focal point displacement caused by the multilayer observation unit, and conducting observation under synchronization, as shown in FIG. 4, a three-dimensional observation can be effected by superimposing a wide range observation and a local detailed observation.

By normalizing a distance in displacement of the sample stage or the objective lens in the optical axis direction of the objective lens and a distance of focal point displacement caused by the multilayer observation unit, a depth of the sample in the optical axis direction can also be measured in a short time. Alternatively, a focal point displacement distance with the multilayer observation unit can be normalized by previously observing a reference sample in which a distance in the depth direction has been measured. The depth of different observation planes can be measured by measuring a difference between an observable observation plane and a focal point displacement distance caused by the multilayer observation unit. On measurement of a depth, it is preferable to use the phase varying means capable of controlling a focal point displacement distance in the optical axis in analogue. By using an electro-optic crystal device having Pochels effect or Kerr effect that can be controlled by an applied electric field as the phase varying means, a focal point displacement distance in the optical direction can be controlled in analog. An example of a material having Pochels effect is a $LiNbO_3$ (lithium niobate) crystal. An example of a material showing Kerr effect is $CS_2$, which is a liquid. A microscope of the invention can simultaneously perform three-dimensional observation and measurement of a length in a short time. Therefore, the invention is optimally applied in an inspection step not only for experiments in a laboratory but also in a production level of microdevices.

A displacement distance range in the optical axis direction can be wider by altering magnifications of the convergence/collimation lenses of the multilayer observation unit. By changing magnifications of the convergence/collimation lenses of the multilayer observation unit according to a size of an sample, the sample can be three-dimensionally observed in one scanning. By providing a structure altering magnifications of the convergence/collimation lenses, a displacement distance range can be optically wider with effectiveness for even a small change in phase by the phase varying means. In other words, the multilayer observation unit can be down sized. A smaller sized phase varying means facilitates a high speed operation for change in phase.

Since a three-dimensional observation can be performed at high speed, a three-dimensional inspection is enabled on a sample in the biomedical organ field and a sample in the electronics field. That is, first of all, a sample having an optically three-dimensional structure is prepared. For example, preparation in the biomedical field is achieved by staining the sample with fluorochrome. In preparation of a sample in the field of electronics such as a semiconductor integrated circuit and the like, depressions and protrusions are formed on a surface of a silicon wafer fabricated generally by etching or the like. A sample is provided for determining whether the sample has a normal three-dimensional configuration including the absolute value of a depth of concavity and convexity or not, and is set on the sample stage. Three dimensional digital data of the observation data is measured by using the construction of a optical microscope of the invention. In order to determine whether the sample has a normal three-dimensional shape or not, digital data obtained by observation of a different sample in a normal three-dimensional shape is set in advance as inspection criterion reference digital data. By comparing three-dimensional digital data of the sample for inspection which has been measured with the inspection criterion digital data, it can be determined whether or not the sample is normal. With repetition of measurement of three-dimensional data conducted, inspection in a dynamic state changing with time can be performed. Inspection in a dynamic state can be realized by evaluating three-dimensional data scanning under synchronization at correct timings. Inspection in a dynamic state requires setting the inspection criterion three-dimensional digital data which changes with time prior to the inspection.

A conventional pattern inspection of an integrated circuit on a silicon wafer has generally been determined based on two-dimensional digital data. An inspection method of the invention enables an inspection using three-dimensional digital data including digital data in the depth direction. In a semiconductor integrated circuit, a surface structure is going to be more and more three-dimensionally progressed, in which situation three-dimensional inspection will be able to be performed at higher speed using a microscope of the invention. In also the medical field, a microscope of the invention can be used in an application requiting inspecting many of samples at a high speed such as medical examination.

INDUSTRIAL APPLICABILITY

According to a multilayer observation real-time optical microscope, especially a confocal microscope, of the invention, as described above, a three-dimensional structure of a cell and a tissue can be observed in situ with a high precision. That is, in a conventional method that cannot observe a sample as a multilayer structure, structure and function in a three-dimensional tissue is constructed by two-dimensional images taken from cultured cells in Petri dish, which is difficult way to understand a natural state of an organ, and in contrast thereto, in the invention, structure and function in an organ is visualized at a high speed and sterographically.

The technical effects of the invention as described above will provide much of information that has not been obtained so far from results of the observation. The effects would be expected to be extremely useful in the medicine field, the biology field and fields related thereto.

In fabrication of a real-time optical microscope of the invention, it is only required to insert the multiple layer observation unit in the optical path immediately before the objective lens of a conventional optical microscope; therefore, the real-time optical microscope can be fabricated at comparatively low cost, which also leads to an extremely great industrial advantage.

The invention claimed is:

1. A multilayer observation optical microscope, comprising:
   a) a light source;
   b) an objective lens for focusing an irradiation light beam from the light source into a sample;
   c) a pair of convergence/collimation lenses placed on an optical axis along which the irradiation light beam from the light source enters into the objective lens;
   d) phase varying means arranged between the convergence/collimation lenses for varying a phase of a transmitting light beam in a given area on a plane traversing the optical axis so as to stepwise adjust a depth of an observation plane of the objective lens; and
   e) a confocal scanner arranged between the light source and the pair of convergence/collimation lenses, the confocal scanner including a microlens array disc disposed on a side of the light source, a Nipkow disc having plural pinholes and disposed on a side of the convergence/collimation lenses in such a manner that it is arranged coaxially and oppositely with the microlens array disc, and a dichroic mirror arranged between the microlens array disc and the Nipkow disc for transmitting the irradiation light beam from the light source while reflecting fluorescence returned from the sample.

2. The multilayer observation optical microscope according to claim 1, wherein the phase varying means comprises a rotating disc having plural phase segments thereon, the respective phase plate segments having different optical characteristics and being arranged for sequentially traversing the optical axis.

3. The multilayer observation optical microscope according to claim 2, wherein the respective phase plate segments of the phase varying means comprise isotropic transparent films of different thickness so as to effect the different optical characteristics thereof.

4. The multilayer observation optical microscope according to claim 2, wherein the respective phase plate segments of the phase varying means comprise isotropic transparent films having different refractive index so as to effect the different optical characteristics thereof.

5. The multilayer observation optical microscope according to claim 1, wherein two-dimensional scanning on a sample stage of the optical microscope and phase scanning with the phase varying means are synchronized with each other so as to enable a three-dimensional dynamic state of the sample to be observed.

6. The multilayer observation optical microscope according to claim 1, wherein the phase varying means comprises a rotating disc having plural phase plate segments thereon, the respective phase plate segments having optical characteristics stepwise different from each other and being adjacently arranged in a circumferential direction.

* * * * *